United States Patent [19]

Baumbach

[11] 4,233,641

[45] Nov. 11, 1980

[54] LINE PROTECTOR FOR A COMMUNICATIONS CIRCUIT

[75] Inventor: Bertram W. Baumbach, Arlington Heights, Ill.

[73] Assignee: Reliable Electric Company, Franklin Park, Ill.

[21] Appl. No.: 27,680

[22] Filed: Apr. 6, 1979

[51] Int. Cl.[3] .......... H02H 3/22

[52] U.S. Cl. .......... 361/119; 361/127

[58] Field of Search .......... 361/117, 119, 126, 127

[56] References Cited

U.S. PATENT DOCUMENTS

| | | | |
|---|---|---|---|
| 3,764,854 | 10/1973 | Craddock | 361/127 |
| 3,934,175 | 1/1976 | Clark | 361/56 |
| 3,975,664 | 8/1976 | Baumbach | 361/124 |
| 4,015,228 | 3/1977 | Eda et al. | 337/28 |
| 4,092,694 | 5/1978 | Stetson | 361/126 |
| 4,150,414 | 4/1979 | Pagliuca | 361/119 X |

*Primary Examiner*—Harry E. Moose, Jr.

*Attorney, Agent, or Firm*—Trexler, Wolters, Bushnell & Fosse, Ltd.

[57] ABSTRACT

A line protector for a communications circuit comprises an insulating base having a ground pin and two pairs of line pins, one pair for each side of the line, projecting through the base. Each pair of line pins has a contact electrically connected thereto and projecting away from the base. The ground pin also has a contact projecting away from the base and spaced from the line pin contacts. A metal oxide varistor having opposed faces provides surge voltage protection for each side of the line. The line pin contacts are bonded to one face of the varistor while the ground pin contact is bonded to the other face of the varistor. Electrically conductive spring clips span the varistor and are pressed toward its opposite faces and in electrical contact with the ground pin contact. An insulating sheet is interposed between the clips and the line pin contacts to prevent one or more of the clips from grounding the line except in such surge condition that heats the varistor sufficiently to melt the insulation.

6 Claims, 4 Drawing Figures

LINE PROTECTOR FOR A COMMUNICATIONS CIRCUIT

BACKGROUND OF THE INVENTION

This invention relates to line protectors embodying surge voltage arresters for use in protecting communication lines from overvoltage or overcurrent surges. The invention is conveniently utilized in a central office protector, although the principals of the invention may be applied to so-called station protectors as well.

Metal oxide varistors are known in surge voltage arresters by reference to United States Patent to Stetson U.S. Pat. No. 4,092,694 granted May 30, 1978. Varistors of this type are non-linear voltage dependent resistances in which the resistance decreases as increasing voltage is applied across the varistor. These varistors are sensitive to heating, and with increasing temperatures the leakage current thereacross increases at a given voltage. The leakage current further produces a rise in temperature in the varistor with the result that the varistor becomes subject to a thermal runaway condition and fails due to the passage of a large current. Varistor failure will often result in hot particles being expelled, a condition which is obviously unsuitable in proximity with other telephone equipment. Nevertheless, it is desirable to be able to utilize metal oxide varistors as surge voltage arresters in central office protector modules of the plug-in type.

OBJECTS AND SUMMARY OF THE INVENTION

An object of the present invention is to provide a line protector that utilizes a varistor of the type stated and which can be embodied into a central office protector module of the plug-in type, thereby enabling the module to be plugged into conventional connector blocks.

A further object of the invention is to provide a line protector of the type stated in which a direct metallic shunt to ground is provided in the event of a surge condition that results in excessive heat build up in the varistor, thereby eliminating or reducing the possibility of a thermal runaway condition or destruction of the varistor.

In carrying out the invention the line protector comprises an insulating support or base, at least one pair of pins projecting through the support for series connection in the line to be protected, a varistor type surge arrester having opposed faces constituting terminal portions, a contact having means electrically connecting said pair of pins, said contact being solder-bonded to one of said opposed faces, a ground terminal, another contact solder-bonded to the other of said opposed faces and joined to said ground terminal, said contacts each having a thermal conductivity substantially that of copper, electrically conductive clip means having portions resiliently biased toward said contacts, a plastic insulating sheet interposed between said clip means and at least one of the contacts, said plastic sheet being meltable when heated during a surge condition on the line to ground the line by direct metallic circuit between the contacts via the clip means.

The varistor may be formed of a zinc oxide ceramic varistor compound and is further characterized in that it passes increasing current for a given voltage with increasing temperature. The varistor has opposed faces to which contacts may be soldered so as to provide a protector circuit from the line to be protected to ground.

DETAILED DESCRIPTION

Figure 1:
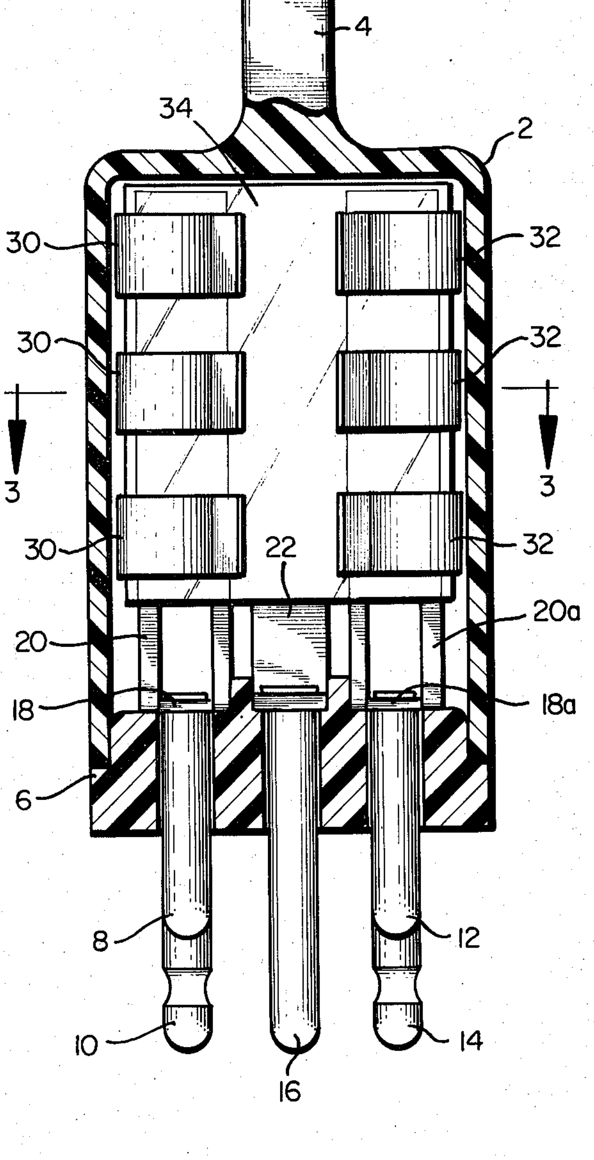
FIG. 1 is a front elevational view, partially broken away and in section, of a line protector constructed in accordance with and embodying the present invention.
Figure 2:
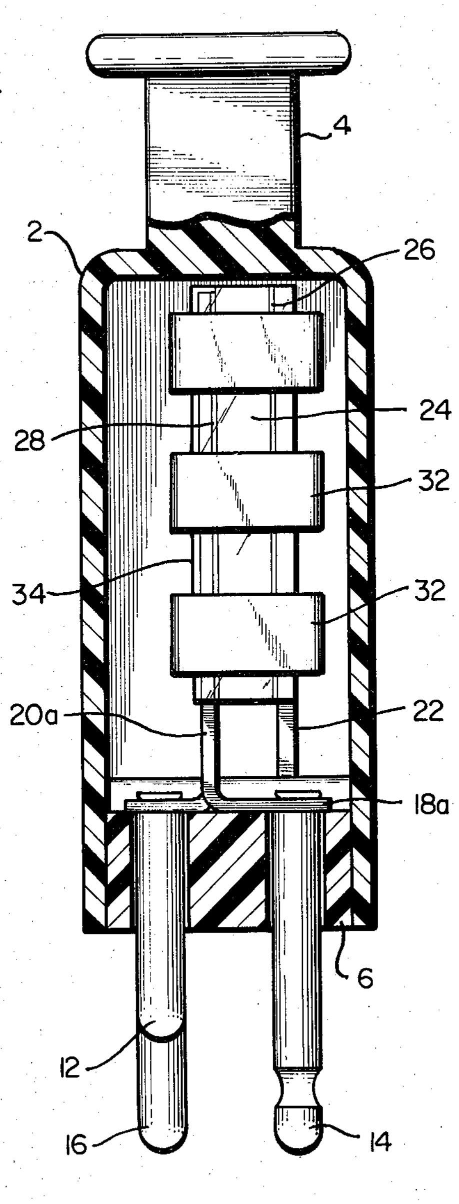
FIG. 2 is a right side elevational view, partially broken away and in section, of the structure of FIG. 1.
Figure 3:
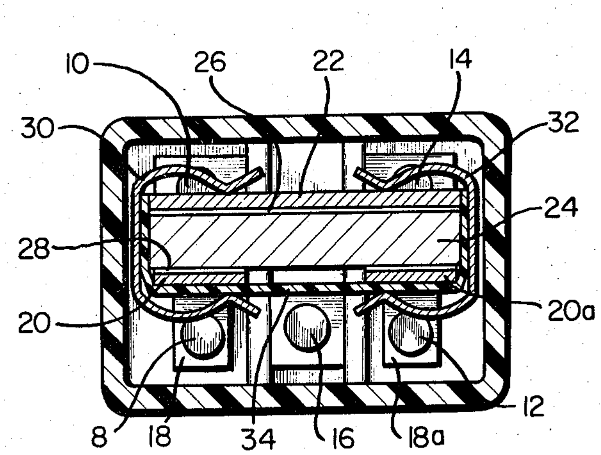
FIG. 3 is an enlarged fragmentary sectional view taken along line 3—3 of FIG. 1.

Referring now in detail to the drawing, there is shown a line protector module of the plug-in type that comprises a housing 2, one end of which has a handle 4 and the other end of which is closed off by a base 6. The housing 2 and its support or base 6 are of a suitable dielectric plastic material. Furthermore, the housing and base may snap-fit together in a conventional manner as by having holes in the housing wall that receive protuberances on the base, more fully shown in U.S. Pat. No. 3,975,664.

Projecting through the base 6 are a number of pins which are disposed in an array of conventional configuration so as to permit the pins to be plugged into a conventional connector block on which inside equipment lines and incoming lines may be terminated. Thus, there is a first short outside line pin 8 and a longer inside equipment pin 10. The pins 8, 10 are in a series with one side of the line to be protected. Similarly, there is a second incoming line pin 12 and a corresponding equipment pin 14 which are in series with the other side of the line to be protected. Intermediate the two sets of pins 8, 10, and 12, 14 is a ground pin 16.

Electrically connecting the line pins 8, 10 is a T-shaped contact 18 of sheet copper or the like which is secured in place by the staked ends of the pins 8, 10 that are adjacent to the base inside of the housing. The contact 18 has an upstanding leg 20 that projects away from the base 6. Electrically connecting the line pins 12, 14 is a contact 18*a* having a leg 20*a*, similar to the corresponding parts 18, 20, previously described. The contacts 18, 18*a* are spaced apart and insulated from each other and the legs 20, 20*a* are substantially parallel. A contact 22 in the form of a ground plate is staked to the end of the ground pin 16. The ground plate 22 projects away from the base 6 in substantially spaced parallel relationship to the legs 20, 20*a*.

A surge voltage arrester of the semi-conductor type in the form of a metal oxide varistor 24 is located within the housing 2. This varistor may be formed of a zinc oxide ceramic varistor compound and being of a type that has a resistance that decreases as increasing voltage is applied thereacross and which heats excessively in an overcurrent surge condition. Such varistors are known in the art. They may be used singly, as shown, or in stacked relation. The opposed flat faces 26, 28 of the varistor constitute electrical terminal portions of the varistor. The legs 20, 20*a* are solder-bonded to spaced apart regions on the varistor face 28 while the ground plate 22 is solder-bonded to the opposite varistor face 26. The high resistance of the varistor compound and the spacing of the legs 20, 20*a* effectively isolate electrically the legs 20, 20*a* and hence the line pin pair 8, 10 from the line pin pair 12, 14. Furthermore, the solder bond of the legs 20, 20*a* and the ground plate 22 holds the varistor substantially rigidly in place within the housing.

A normally open shunt circuit is provided between the leg 20 and the ground plate 22. A similar normally open shunt circuit is provided between the leg 20*a* and the ground plate 22. This shunt circuit is operable to close and ground the line in the event of a surge condition on the line that causes an overcurrent condition from the line to ground that results in excessively heating the varistor 24. These shunt circuits comprise a first set of U-shaped metallic spring clips 30, 30, 30 in proximity to the leg 20 and a second set of similar spring clips 32, 32, 32 is proximity with the leg 20*a*. There could be a greater or lesser number of clips. For example, there might be four or five clips depending upon the width chosen for each clip. In any event, the clips straddle the varistor such that the arms of the clips are resiliently biased toward each other and thus toward the adjacent legs 20, 20*a* and the ground plate 22.

To prevent an electrically conductive connection between the clips 30 or 32 and the ground plate 22 under normal operating conditions a thin sheet of plastic 34 is disposed over one face of the varistor for instance at the face at which the legs 20, 20*a* are soldered. This sheet of plastic 34 may also extend around and cover the side edges of the varistor 24. The plastic 34 thus prevents electrical connection between the clips 30, 32 and the leg 20 or 20*a* as the case may be. The plastic insulating sheet 34 may be approximately 0.004 to 0.005 inches in thickness and may be a well known and commercially available polyethylene terephthalate resin sold under the trademark Mylar.

In a fast rise overvoltage transient the energy of the surge is dissipated from line to ground through the varistor 24 without an overheating of the varistor. However, a prolonged surge may heat the varistor to the point that it might otherwise be subjected to thermal runaway. However, this heat is transmitted from the legs 20, 20*a* to the plastic sheet 24 which melts in one or more regions near one or more of the clips 30, 32. This results in one or more of the clips pressing directly against the leg 20 or 20*a*, providing a direct metallic connection between the line circuit and ground. The copper material of the legs 20, 20*a* tend to pick up the heat rapidly from one or more hot spots which may form on the surface of the varistor. This aids in a rapid melting of the plastic under prolonged surge conditions.

Figure 4:
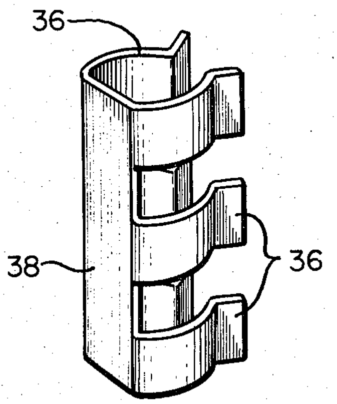
FIG. 4 is a perspective view of a modified form of clip construction that forms part of the present invention.

FIG. 4 shows a modified form of clip assembly in accordance with this invention. In the clip structure of FIG. 4 a series of clip members 36, 36, 36 are generally similar to the clip members 30, 32 clip member previously described. However, instead of being separate clips, they are joined by a common backbone or bight 38.

This invention is claimed as follows:

1. A line protector comprising an insulating base, line pins projecting through said base for connection to a line to be protected, and a terminal for connection to ground; a surge voltage arrester of the semi-conductor type that has a resistance that decreases as increasing voltage is applied thereacross and which heats excessively in an overcurrent surge condition on the protected line, said arrester comprising opposed surfaces forming terminal portions one of which is in electrical connection with said ground terminal, the other terminal portion being in electrical connection with the line pins, and means forming a normally open shunt circuit between said opposed terminals but operable to close and thereby ground the line in the event of a surge condition on the line that causes said overcurrent condition, said shunt circuit comprising resilient electrically conductive means biased toward at least one of said terminal portions, a dielectric member in thermally conducting relation with said surge arrester, said resilient means being prevented from contacting said one terminal portion by said dielectric member except when an overcurrent condition that heats the semi-conductor a sufficient amount to melt said dielectric member.

2. A line protector according to claim 1 in which said resilient means comprises at least one spring clip that straddles the semi-conductor and is biased toward said opposed terminal portions, and said dielectric member is a sheet of plastic material interposed between the clip and a terminal portion.

3. A line protector according to claim 2 in which said semi-conductor is a metal oxide varistor.

4. A line protector according to claim 1 or 2 in which there is an electrically conductive contact against each of said opposed terminal portions, one such contact being electrically connected to the line terminal and the other contact being electrically connected to the ground terminal, said conductive contacts each having a thermal conductivity substantially that of copper to transfer heat rapidly to said dielectric member.

5. A line protector comprising an insulating support, at least one pair of pins projecting through the support for series connection in the line to be protected, a varistor type surge arrester having opposed faces constituting terminal portions, a contact having means electrically connecting said pair of pins, said contact being solder-bonded to one of said opposed faces, a ground terminal, another contact solder-bonded to the other of said opposed faces and electrically connected to said ground terminal, said contacts each having a thermal conductivity substantially that of copper, electrically conducted clip means having portions resiliently biased toward said contacts, and a plastic insulating sheet interposed between said clip means and at least one of the contacts normally to prevent conduction between the contacts, said sheet being meltable when heated during a surge condition on the line to cause a direct metallic circuit between the contacts via the clip means.

6. A line protector according to claim 5 including a further pair of pins projecting through said support for series connection in one side of a line, the first mentioned pins being on the other side of said line, a second contact having means electrically connecting said further pair of pins, said second contact being solder bonded to said one opposed face in spaced insulating relation to the first-mentioned contact.

* * * * *